Patented Aug. 5, 1947

2,425,126

UNITED STATES PATENT OFFICE 2,425,126

DIBENZOYLAMINO DIANTHRIMIDE CARBAZOLE DYESTUFFS

Mario Scalera, Somerville, and Hugh Wendell Stewart, Plainfield, N. J., assignors to American Cyanamid Company, New York, N. Y., a corporation of Maine No Drawing. Application August 27, 1943, Serial No. 500,276

4 Claims. (Cl. 260—316)

The invention relates to an improved process of preparing a mixture of 4,5' and 4,8'-dibenzoylamino-1,1'-dianthrimide carbazoles.

The 4,5'-di-benzoylamino-1,1'-dianthrimide-2,2'-carbazole is a vat dyestuff of great commercial importance because of it outstanding properties of shade and fastness. The dianthrimide which is used to form the final carbazole is prepared from the corresponding chlorbenzoylaminoanthaquinone and aminobenzoylaminoanthraquinone by reaction in the presence of a cupriferous catalyst and an acid binding substance in boiling nitrobenzene. The same product is obtained whether the halogen is on the heteronuclear anthraquinone compound and the amino on the homonuclear or vice versa. The two reactions may be represented by the following equations.

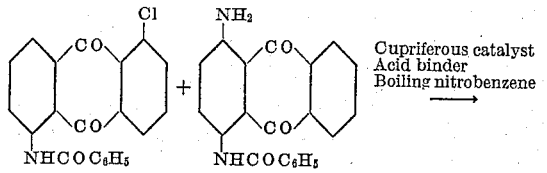

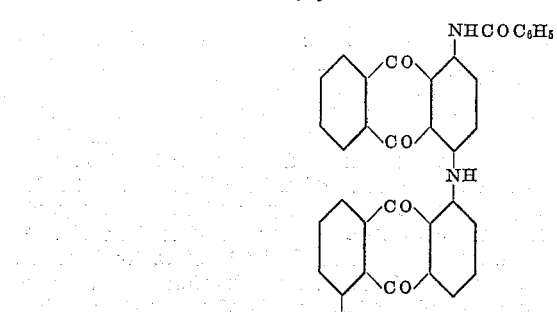

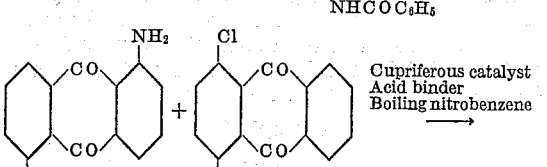

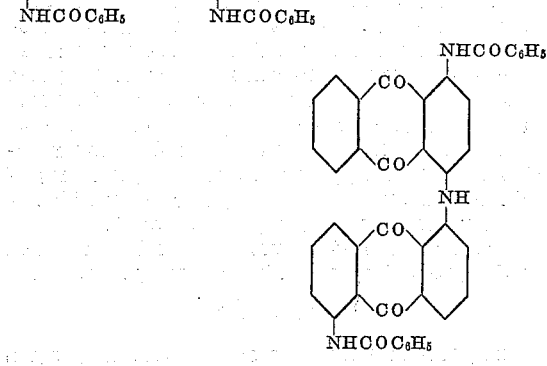

The dianthrimide is then usually submitted to ring closure by the aid of sulfuric acid and the process is completed by an oxidation in aqueous suspension, such as with sodium dichromate or sodium nitrite in dilute sulfuric acid, or with hypochlorites.

The production of the 1,5 anthraquinone intermediates always results in producing some 1,8 derivatives. Because of the rather similar properties of 1,5 and 1,8 derivatives of anthraquinone, it is a difficult problem to obtain the pure 1,5 derivatives. Their yield is low, amounting to 20-30% based on the anthraquinone used, and the purification is an expensive and difficult process.

It has hitherto been considered that to obtain dyestuffs of satisfactory characteristics the 4,5'-dianthrimide had to be practically free from any 4,8' isomer. Past experience showed that when an impure anthrimide was subjected to ring closure to produce the carbazole by the conventional method of treatment with concentrated sulfuric acid followed by oxidation, dyes were obtained which were duller, weaker tinctorially, and considerably poorer in fastness, as well as less resistant to the oxidation, requiring more oxidizing agent and giving lower yields. Because of these adverse results it had been considered that pure anthrimides should be used and great pains were taken to obtain such anthrimides.

We have found that the adverse effect of the 4,8' isomer is apparently not due to contamination of the product with the carbazole resulting from ring closure of the 4,8'-dianthrimide. In fact, when the latter dye is prepared using aluminum chloride as a ring closing agent a bright dye is obtained which is not seriously different in shade, fastness properties, and resistance to oxidation from that obtained from the 4,5'-dianthrimide. This led to an investigation of the behaviour of the 4,8'-dianthrimide, and we found that this compound does not undergo ring closure to form carbazoles in sulfuric acid, even at temperatures up to 100° C., and at higher temperatures extensive decomposition takes place such as hydrolysis of the benzoyl groups and the like. It is these decomopsition products of the unreacted 4,8'-dibenzoylamino-dianthrimide which appear to cause the dull shade and to produce the undesirable characteristics of dyes made in the past from impure 4,5'-dibenzoylamino-dianthrimide.

This discovery first suggested to us the possibility of ring closure of a mixed dianthrimide by means of aluminum chloride in nitrobenzene, which procedure operates smoothly with the 4,8'-dianthrimide even at temperatures as low as 25-30° C. Unfortunately when this procedure is tried the results are completely unsatisfactory, because the 4,5'-dibenzoylamino-1,1'-dianthrimide does not undergo carbazole ring closure under these conditions or even at 60° C., and tends to extensive debenzoylation in the presence of aluminum chloride which is particularly marked at higher temperatures.

The present invention is based on the surprising discovery that, although the use of either concentrated sulfuric acid alone or aluminum chloride alone will produce dyes of poor shade and inferior characteristics when using mixed dianthrimides, if the aluminum chloride nitrobenzene treatment is carried out at low to moderate temperatures below 50° C., and preferably about 25–30° C., and followed by isolation of the mixture of unreacted dianthrimide and carbazole, and treatment of the same with concentrated sulfuric acid at temperatures below 50° C., a product is obtained consisting exclusively of carbazoles of the two isomeric anthrimides and on oxidation by the conventional oxidation procedures the resulting dyestuffs are obtained in high yield and are as bright, fast and strong tinctorially as a mixture of the two isomeric carbazoles prepared separately from pure dianthrimides.

The reason why in the combined process of the present invention the decomposition which results when it is attempted to ring close mixed dianthrimides by either process alone is not encountered has not been fully determined, and this surprising result is, therefore, not intended to be limited to any theory of action. In fact, it goes contrary to the prior knowledge that treatment of 4,5'-dibenzoylamino-1,1'-dianthrimide with aluminum chloride in nitrobenzene finally results in complete hydrolysis of one benzoylamino group. It is possible that the reactivity of the 4,8' isomer with aluminum chloride is so great that this reaction proceeds without substantial action of the aluminum chloride on the other isomer, but it is, of course, not possible to determine exactly what goes on in the reaction mixture, and it may well be that other factors enter in and are perhaps of even greater importance.

The process of the present invention represents an important practical advance. It is possible to utilize mixtures of anthrimides obtained from 1,8 and 1,5 anthraquinone intermediates, the yields of useful dyestuff from anthraquinone being increased from 15–20% up to more than 50%, and it is not necessary to carry out the expensive purification steps. For most purposes there is a practical advantage in using a total mixture of 1,5 and 1,8 isomers in the proportions in which they are obtainable without any separation. However, for certain processes, such as for example exact shade matching, it may be desirable to effect a partial separation by removing part of the 1,8 isomer from the mixture of halogen benzoylamino or aminobenzoylamino anthraquinones. The separation need only be partial and two separate mixtures may be obtained, one of which is relatively richer in 4,5'-dibenzoylamino-1,1'-dianthrimide and the other relatively richer in the 4,8' isomer. Carbazole dyestuffs prepared from the first mixture dye somewhat yellower shades of brown than those obtained from the mixture richer in the 4,8' isomer. Apparently the present process is applicable to almost any mixture of the two isomers and this great flexibility is an additional advantage of the process.

It is also an advantage of the present process that it does not require any material changes in many of the steps. Thus, for example, the oxidation of the final carbazole dyestuff may be effected by procedures which have been used in the past, for example, by oxidation in aqueous suspension with such oxidizing agents as sodium dichromate or sodium nitrite in dilute sulfuric acid or with hypochlorites. All of the advantages of the present invention are, therefore, obtainable without requiring special equipment and without departing from well-known procedures in many of the steps of the process.

As has been stated above, the ring closures of the present invention are carried out at temperatures not exceeding 50° C., and preferably at 25–30° C. The preferred range, while desirable, is not critical. Increasing the temperature only slightly increases decomposition, provided it does not exceed 50° C., particularly in the aluminum chloride step.

The first step of the process of the present invention, namely the treatment with aluminum chloride, is carried out in inert solvents, preferably nitrohydrocarbons of the benzene series. Nitrobenzene is the cheapest member and, giving excellent results, is preferred for economic reasons. Other nitrohydrocarbons such as various isomeric nitrotoluenes and nitroxylenes may be used with equal effectiveness.

The invention will be described in greater detail in conjunction with the specific examples. The parts are by weight.

*Example 1*

171 parts of a mixture consisting of approximately equal parts of 1-amino-5-benzoylamino anthraquinone and 1-amino-8-benzoylamino anthraquinone, 181 parts of 1-chloro-4-benzoylamino anthraquinone, 93 parts of soda ash, 6 parts of copper powder and 6 parts of iodine are added to 4,300 parts of nitrobenzene and the reaction mixture is heated at the boil for 8 hours. The reaction is cooled and 1,100 parts of powdered aluminum chloride are slowly added with stirring and cooling. One-half hour after all of the aluminum chloride has been added, the reaction is drowned into 8,000 parts of water and 1,650 parts of sodium hydroxide are added. The nitrobenzene is removed by steam distillation. The residue is isolated by filtration, washed and dried. The product is dissolved in 6,600 parts of 98% sulfuric acid and held for 1½ hours at 15–20° C. The solution is then poured into 26,000 parts of water containing 666 parts of sodium dichromate and it is agitated at 75–80° C. for 2 hours. The solid is isolated by filtration and washed. There is obtained 300 parts of dyestuff or a yield of 90% of the theoretical from the mixed amino benzoylamino anthraquinone. The dyestuff dyes cotton a bright red-brown shade which is very fast to light, chlorine and washing.

*Example 2*

181 parts of a mixture of approximately equal parts of 1-chloro-5-benzoylamino and 1-chloro-8-benzoylamino anthraquinone, 171 parts of 1-amino-4-benzoylamino anthraquinone, 93 parts of soda ash, 6 parts of copper powder and 6 parts of iodine are added to 4,300 parts of nitrobenzene. The procedure followed for the Ullmann reaction and the ring closure, and the quantities of all materials used from this point on, are identical to those described under Example 1.

There is obtained 295 parts of dyestuff identical to the product obtained by following Example 1.

*Example 3*

181 parts of a mixture of approximately equal parts of 1-chloro-5-benzoylamino and 1-chloro- 8-benzoylamino anthraquinone, 171 parts of 1-amino-4-benzoylamino anthraquinone, 93 parts of soda ash, 6 parts of copper powder and 6 parts of iodine are added to 4,300 parts of nitrobenzene. The reaction is heated at the boil for 8 hours and cooled. The product is isolated by filtration, washed with nitrobenzene and distilled with steam until all of the nitrobenzene has been removed. The solid is isolated by filtration and dried. Yield is 250 parts of dianthrimide or 75%.

334 parts of the above dianthrimide are stirred into 4,300 parts of nitrobenzene. 1,100 parts of aluminum chloride are added and the product is worked up using the same amounts and procedure as those described in Example 1. There is obtained 304 parts of dyestuff or a yield of 91% from the dianthrimide. This product is identical with that obtained in Examples 1 and 2.

Example 4

181 parts of 1-chloro-8-benzoylamino anthraquinone and 171 parts of 1-amino-4-benzoylamino anthraquinone are used. The other ingredients, as well as the procedure, are those given in Example 1. There is obtained 290 parts of a bright red-brown dyestuff, which shows excellent properties of fastness.

Example 5

181 parts of 1-chloro-5-benzoylamino anthraquinone and 171 parts of 1-amino-4-benzoylamino anthraquinone are used. The procedure followed, and other quantities, are those given in Example 1. There is obtained 293 parts of a red-brown dyestuff, yellower than the products of Examples 1 and 2, and much yellower than the product obtained in Example 4.

We claim:

1. A process for producing mixtures of 4,5'- and 4,8'-dibenzoylamino-1,1'-dianthrimide carbazole dyestuffs, which comprises treating a mixture of 4,5'-dibenzoylamino-1,1'-dianthrimide and 4,8'-dibenzoylamino-1,1'-dianthrimide with aluminum chloride in a nitro-hydrocarbon of the benzene series at a temperature below 50° C., and treating the resulting product with concentrated sulfuric acid at a temperature below 50° C.

2. A process for producing mixtures of 4,5'- and 4,8'-dibenzoylamino-1,1'-dianthrimide carbazole dyestuffs, which comprises treating a mixture of 4,5'-dibenzoylamino-1,1'-dianthrimide and 4,8'-dibenzoylamino-1,1'-dianthrimide with aluminum chloride in nitrobenzene at a temperature below 50° C., and treating the resulting product with concentrated sulfuric acid at a temperature below 50° C.

3. A method according to claim 1 in which the treatment with aluminum chloride is effected at a temperature between 25–30° C.

4. A method according to claim 2 in which the treatment with aluminum chloride is effected at a temperature between 25–30° C.

MARIO SCALERA.
HUGH WENDELL STEWART.

REFERENCES CITED

The following references are of record in the file of this patent:

UNITED STATES PATENTS

| Number | Name | Date |
|---|---|---|
| 2,032,520 | Wuertz | Mar. 3, 1936 |
| 2,073,022 | Mieg | Mar. 9, 1937 |
| 2,278,973 | Carr | Apr. 7, 1942 |
| 1,856,207 | Bruns et al. | May 3, 1932 |
| 1,809,212 | Mieg et al. | June 9, 1931 |
| 2,212,028 | Lulek | Aug. 20, 1940 |
| 2,188,776 | Lulek | Jan. 30, 1940 |
| 2,152,186 | Graham | Mar. 28, 1939 |
| 2,212,965 | Wieners | Aug. 27, 1940 |

FOREIGN PATENTS

| Number | Country | Date |
|---|---|---|
| 711,433 | France | June 30, 1931 |
| 296,758 | Great Britain | Apr. 25, 1929 |
| 238,523 | Great Britain | Sept. 2, 1926 |
| 439,296 | Great Britain | Dec. 4, 1935 |